Figure 2:
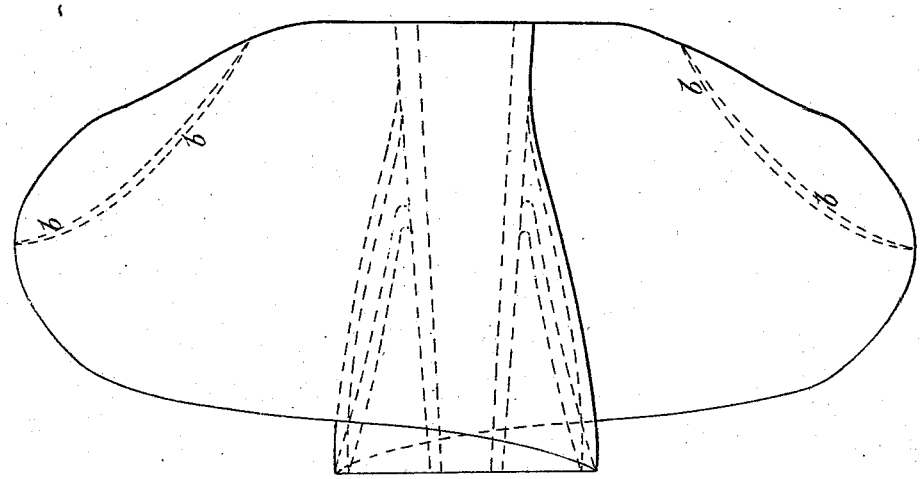

(Model.)  2 Sheets—Sheet 1.

G. J. STEVENS & J. S. SMITH.
Screw Propeller.

No. 235,657.  Patented Dec. 21, 1880.

Witnesses
Pennington Halsted
Sam R Turner

Inventors.
George John Stevens
and John Samuel Smith
by John J. Halsted
their Atty.

(Model.) 2 Sheets—Sheet 2.

G. J. STEVENS & J. S. SMITH.
Screw Propeller.

No. 235,657. Patented Dec. 21, 1880.

UNITED STATES PATENT OFFICE.

GEORGE J. STEVENS AND J. S. SMITH, OF LONDON, ENGLAND.

SCREW-PROPELLER.

SPECIFICATION forming part of Letters Patent No. 235,657, dated December 21, 1880.

Application filed May 18, 1880. (Model.) Patented in England June 9, 1879.

*To all whom it may concern:*

Be it known that we, GEORGE JOHN STEVENS and JOHN SAMUEL SMITH, of London, England, have invented certain Improvements in Screw-Propellers for Propelling Vessels, applicable also to screws for other purposes, of which the following is a specification, and for which Letters Patent have been granted to us in England, dated June 9, 1879, No. 2,270.

According to this invention we generate the screw-surfaces, such as the surface of a screw-propeller or screw to be used for pumping or forcing fluids, by the following method: We take a tractrix curve—that is, a curve the length of whose tangents to a given straight line is constant—and cause this curve to revolve uniformly around the given straight line which is an asymptote to the curve, and at the same time traverse along it at a uniform rate. A curved screw-surface is thus generated having the properties that any circles described in planes at right angles to the axis and having their centers on the axis will meet the screw-surface at a constant angle, and if such screw-surface is cut by a plane at right angles to the axis the trace of the curved screw-surface will be a spiral which meets the axis at an angle equal to the angle of pitch at the periphery of the screw.

For distinction we will call the tractrix curve the primary curve, and the trace of the screw-surface, when cut by a plane at right angles to the axis, the secondary curve. By the aid of this secondary curve we generate the screw-surface of a screw-propeller or screw for forcing or raising fluids.

If we take the secondary curve and let it rotate about and traverse along the axis, keeping the amount of rotation and the rate of traverse the same as in the former case, the original screw-surface is produced; but if the traverse be more or less, then the angle of surface to circles in planes at right angles to the axis will vary continuously from the periphery to the axis. The angle at the periphery will be the angle of pitch, while the angle when meeting the axis will remain the same as in the former case.

It will thus be seen that we are enabled to construct a screw-surface of any desired angle, irrespective of the pitch of the said screw, in any of the following ways: First, constant angle of surface from periphery to root or axis—A equal to the pitched angle of screw—that is, when the whole of the primary curve is used; B equal to any angle less than the pitched angle of screw—that is, when only part of the primary curve is used, the outer extremity of this curve being cut away; second, angle to vary from periphery to root or axis produced by giving greater or less rate of traverse to the secondary curve—A from greater to less; B from less to greater.

To enable our invention to be readily understood we will now refer to the accompanying drawings, which represent various views of screws constructed according to our improvements.

Figure 1:
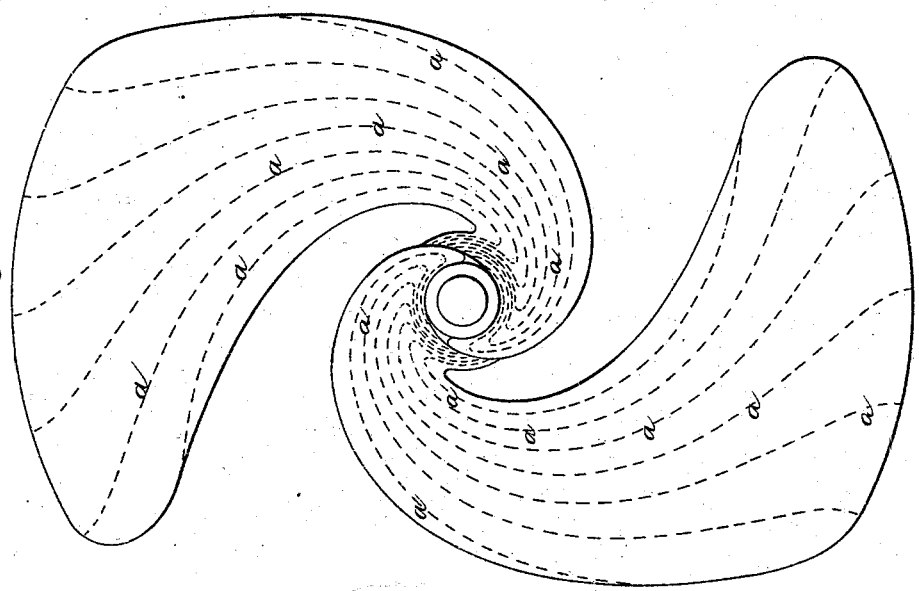
Figure 3:
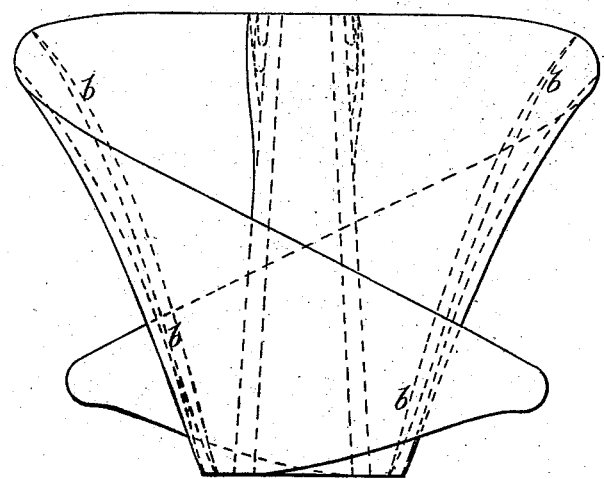

In the drawings, Figure 1, Sheet 1, represents the projection of a screw-propeller in a plane perpendicular or at right angles to the axis of the screw; Fig. 2, Sheet 1, and Fig. 3, Sheet 2, projections of the same screw in the vertical and horizontal planes of the axis respectively. In this screw the pitch equals one and a half diameter, and the length equals one-third of the pitch, the angle of surface from the periphery to the root or axis being constant.

The dotted lines marked *a a* show what we term the secondary curve or spiral, and the dotted lines *b b* show the sections of the blade when cut by the plane of the axis.

There are other spiral curves, which are very similar to the secondary curve, generated, as above described, from a tractrix curve, but which have not precisely the same properties. Still it will be seen that they may be used in a similar manner to generate screw-surfaces that in their action will be little, if anything, inferior to those generated by the tractrix curve.

The form of the blade of the propeller will depend entirely upon the form or curve of the back surface, which should be so shaped as to give the requisite strength of blade, and at the same time give its entering and leaving edges the finest lines consistent with the length of the blade.

Having thus described our invention and the means of performing the same, what we claim, and desire to protect by the herein in part recited Letters Patent, is—

A screw-propeller or screw for forcing or lifting liquids, the surfaces of the blades of which have the curves described—namely, such as would be generated by taking a tractrix curve as a primary curve and causing it to revolve uniformly around the given straight line which is the asymptote to the curve, and at the same time to traverse along it at a uniform rate, and then taking a secondary curve, which is the trace of the screw-surface when cut by a plane at right angles to the axis, and rotating it about and moving it along the axis, as set forth.

GEORGE JOHN STEVENS.
JOHN SAMUEL SMITH.

Witnesses:
G. F. REDFERN,
A. ALBUTT.